US012664803B2

(12) United States Patent
Price

(10) Patent No.: US 12,664,803 B2
(45) Date of Patent: Jun. 23, 2026

(54) SYSTEM AND METHOD FOR ROBUST ESTIMATION OF STATE PARAMETERS FROM INFERRED READINGS IN A SEQUENCE OF IMAGES

(71) Applicant: Genesee Valley Innovations, LLC, Santa Clara, CA (US)

(72) Inventor: Robert R. Price, Palo Alto, CA (US)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 464 days.

(21) Appl. No.: 18/105,493

(22) Filed: Feb. 3, 2023

(65) Prior Publication Data

US 2024/0265717 A1 Aug. 8, 2024

(51) Int. Cl.
| | |
|---|---|
| *G06F 16/25* | (2019.01) |
| *G06F 16/55* | (2019.01) |
| *G06N 7/01* | (2023.01) |
| *G06V 30/18* | (2022.01) |
| *G06V 30/186* | (2022.01) |
| *G06V 30/19* | (2022.01) |

(52) U.S. Cl.
CPC ........ *G06V 30/18095* (2022.01); *G06F 16/55* (2019.01); *G06N 7/01* (2023.01); *G06V 30/186* (2022.01); *G06V 30/19187* (2022.01)

(58) Field of Classification Search
CPC ........... G06V 30/18095; G06V 30/186; G06V 30/19187; G06F 16/55; G06N 7/01
See application file for complete search history.

(56) References Cited

U.S. PATENT DOCUMENTS

| | | | |
|---|---|---|---|
| 2004/0119998 A1* | 6/2004 | Xiong ................. | H04N 1/3263 |
| | | | 358/1.13 |
| 2011/0043710 A1* | 2/2011 | Samarasooriya ............................ | |
| | | | H04N 21/42203 |
| | | | 348/735 |
| 2011/0058231 A1* | 3/2011 | Oshima .................... | H04N 1/38 |
| | | | 358/474 |

OTHER PUBLICATIONS https://www.youtube.com/watch?v=4AKrmbM0axc. (Year: 2015).*

* cited by examiner

*Primary Examiner* — Huo Long Chen
(74) *Attorney, Agent, or Firm* — Maginot, Moore & Beck, LLP

(57) ABSTRACT

A system and method for robust estimation of state parameters from internal readings in a sequence of images are provided. Various techniques can be implemented to address observation noise and/or underlying process noise to stabilize the readings.

14 Claims, 4 Drawing Sheets

SYSTEM AND METHOD FOR ROBUST ESTIMATION OF STATE PARAMETERS FROM INFERRED READINGS IN A SEQUENCE OF IMAGES

BACKGROUND

In systems that have non-connected devices, it can be useful to obtain data from the non-connected devices. One way to achieve this is to use imaging to effectively read displays on those non-connected devices and use the real data in the systems.

For instance, a task assistance system or process logging application might use the camera on smart glasses to read a seven-segment display on a microwave, thermometer, scale or gas pump and use this to tailor advice, verify conditions for a procedure or auto-populate a log of a procedure. In each of these applications, it is difficult to get a stable reading of the display.

BRIEF DESCRIPTION

In one aspect of the presently described embodiments, a system to improve the stability of inference for the state of a system parameter from a sequence of images of a measuring device with a digital display comprises at least one processor and at least one memory having stored thereon instructions that, when executed, cause the system to perform extracting digits from the images, populating mathematical bins with the digits extracted from the images, and selecting at least one value that is most frequent based on population of the bins.

In another aspect of the presently described embodiments, the bins are histogram bins.

In another aspect of the presently described embodiments, the system is further caused to perform outputting selected values.

In another aspect of the presently described embodiments, the system is further caused to perform processing selected values using an exponential averaging filter to obtain results representing a display of digits on the digital display.

In another aspect of the presently described embodiments, the system is further caused to perform outputting the results.

In another aspect of the presently described embodiments, a method which improves the stability of inference for the state of a system parameter from a sequence of images of a measuring device with a digital display comprises extracting digits from the images, populating mathematical bins with the digits extracted from the images, and selecting at least one value that is most frequent based on population of the bins.

In another aspect of the presently described embodiments, the bins are histogram bins.

In another aspect of the presently described embodiments, the method further comprises outputting selected values.

In another aspect of the presently described embodiments, selected values are processed using an exponential averaging filter to obtain results representing a display of digits on the digital display.

In another aspect of the presently described embodiments, the method further comprises outputting the results.

In another aspect of the presently described embodiments, a system to improve the stability of inference for the state of a system parameter from a sequence of images of a measuring device with a digital display comprises at least one processor and at least one memory having stored thereon instructions that, when executed, cause the system to perform building a probabilistic mixture model from the values inferred from the images, and returning a mean of the most likely component.

In another aspect of the presently described embodiments, the distributions are Gaussian.

In another aspect of the presently described embodiments, the system is further caused to perform outputting results.

In another aspect of the presently described embodiments, a method which improves the stability of inference for the state of a system parameter from a sequence of images of a measuring device with a digital display comprises building a probabilistic mixture model from the values inferred from the images and returning a mean of the most likely component.

In another aspect of the presently described embodiments, the distributions are Gaussian.

In another aspect of the presently described embodiments, the method further comprises outputting results.

In another aspect of the presently described embodiments, a non-transitory computer readable medium having instructions stored thereon that, when executed by a processer, cause an apparatus to perform a method which improves the stability of inference for the state of a system parameter from a sequence of images of a measuring device with a digital display, the method comprises extracting digits from the images, populating mathematical bins with the digits extracted from the images, and selecting at least one value that is most frequent based on population of the bins.

In another aspect of the presently described embodiments, the apparatus is further caused to perform outputting selected values.

In another aspect of the presently described embodiments, the apparatus is further caused to perform processing on selected values using an exponential averaging filter to obtain results representing a display of digits on the digital display.

In another aspect of the presently described embodiments, the apparatus is further caused to perform outputting the results.

In another aspect of the presently described embodiments, a non-transitory computer readable medium having instructions stored thereon that, when executed by a processer, cause an apparatus to perform a method which improves the stability of inference for the state of a system parameter from a sequence of images of a measuring device with a digital display, the method comprises building a probabilistic mixture model from the values inferred from the images and returning a mean of the most likely component.

In another aspect of the presently described embodiments, the apparatus is further caused to perform outputting results.

DETAILED DESCRIPTION

Figure 1:
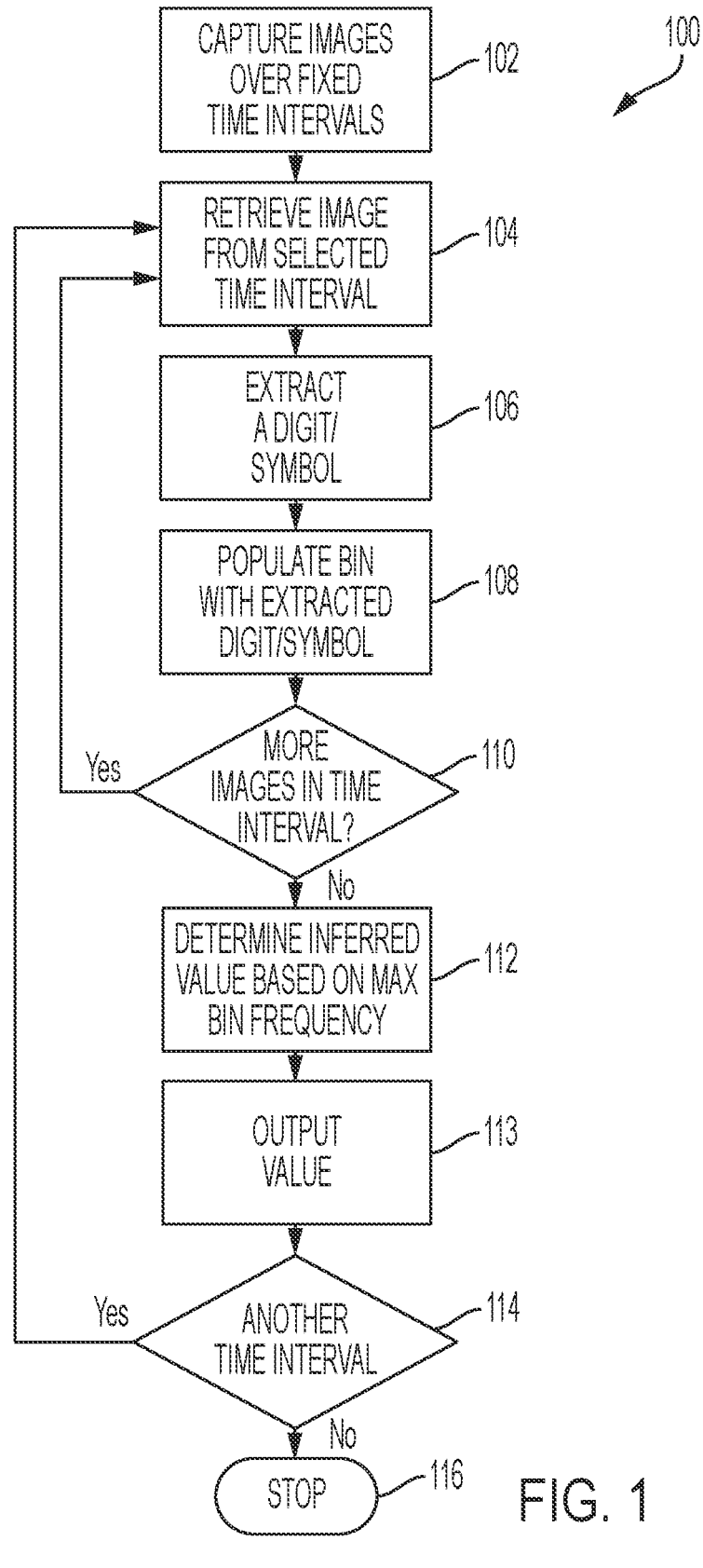
FIG. 1 is a flowchart of an example method according to the presently described embodiments.

In at least one form, the presently described embodiments relate to a system and/or method which improves the stability of inference for the state of a system parameter from a sequence of images of a measuring device with a digital display. That is, in at least one form, the presently described embodiments stabilize numerical readings extracted from video streams of non-connected devices with digital displays. As noted, with conventional technology, it is difficult to achieve desired stability in such readings.

In this regard, the use of averaging or filtering to stabilize inferences of state parameters has extensive treatment in literature. Various forms of filtering have been developed to address different types of noise or variation. For instance, Kalman filtering can be used to provide stable estimates of position and velocity of linear dynamic systems through a weighted averaging of sensor readings known to have Gaussian uncertainty. Mild departures from Gaussian behavior are addressed by extensions such as the Unscented Kalman Filter. If the process and/or observation noise is not Gaussian, a discrete Markov chain can be used with a discrete state transition model and a custom conditional observation probability model. The Viterbi algorithm can be used to infer stabilized estimates of the system state.

In the case of inferring digits from a video feed, however, the noise is not typically Gaussian or related to typical conventional distributions in the exponential family. For instance, perhaps we have a scale that has a reading of 100 grams. However, due to highlights on the seven-segment display, the leading 1 is occasionally recognized as a 7. If this error happens one in ten times, our average reading would be $(9*100+1*700)/10=160$ which has inflated the true value by 60%.

Similarly, consider a true scale reading of 1. It is possible that a top bar near the 1 is incorrectly read to result in a reading of 7 (instead of 1) in one instance. If ten (10) readings are taken, where nine (9) are correctly read as 1 but a single instance is incorrectly read as 7, the average is: $(9*1+1*7)/10=1.6$. Because 1.6 is not a valid digit, the averaging result would be rounded up to 2. Of course, 2 is not an accurate result if the reading is actually 1.

This kind of noise is not Gaussian. It is a complex noise process generated by the confusability of seven-segment display digits with optical effects at the surface of the device and the camera. The noise is also independent for each digit so it generally makes sense to stabilize inference at the digit level instead of the multi-digit number the sequence of digits represent. The number can then be assembled from the individually stabilized digits.

Thus, simply using averaging or perhaps a median calculation on inferred values is not useful in many applications. As demonstrated by the simple example above, the average or mean can be skewed by the kind of noise generated from visual inference. Unfortunately, while a median can be more robust, it can still be thrown off if there is a long tail of noise values.

The presently described embodiments provide stabilized estimates for the kind of noise process generated by visual inference of numerical quantities. The presently described embodiments can be used in assistance applications, for example, that read displays using smart glasses to provide assistance or log behavior or key outcomes with interfaces to legacy devices that use cheap webcams to read displays on machines that are not connected, and in robotics automation where a robot needs to operate devices with digital display.

A notable problem is that the readings generated by visual noise processes tend to fall into multiple distinct modes. Methods that can track multiple modes and estimate their frequency can be used to address this problem. Where readings are relatively stable, such as a thermometer for taking human temperatures, the reading will be extremely stable and the variability will be due to perception. In this case, the following procedure is adopted according to the presently described embodiments. In at least one embodiment, video frames are collected over a short window or time interval such as a fixed time interval. The window could be rolling a window that crawls forward along the sequence of frames one frame at a time or a tumbling window that jumps forward so that no frame is ever in two windows depending on whether more stability or computational efficiency is needed. Visual inference is run on each frame to extract digits or symbols (e.g., through Optical Character Recognition (OCR) or deep network trained techniques such as that used for Google Streetview). A negative symbol could be used for negative numbers, decimal points for numbers with fractional components and colons for times. The digits or symbols are then binned in a sparse dictionary-based histogram, although various techniques could be used accomplish these objectives. The maximum frequency bucket, in this example case, is returned as the inferred digit or symbol. The sequence of inferences can be assembled to form a numeric value or other coherent value such as a time. It will be appreciated that this approach, as well as others described herein, have particular advantageous application where desired values are detected more frequently than undesired values.

With reference to FIG. 1, a flowchart for an example method 100 is shown. As shown, the method 100 begins, in at least one form, with the capture of images over time intervals such as fixed time intervals or windows (at 102). The time for such capture and the fixed time intervals or windows over which sets of images are captured varies from application to application. In an implementation where the results are used for feedback, for example, to control a process, the frequency of capture may be higher and the fixed time intervals may be shorter—to provide faster response to maintain control and avoid ringing or other undesirable effects. In implementation where data is produced for observation, such as for logging data in experimental environments, the frequency of capture and time intervals may be adapted to the environment and, for example, may be less frequent with larger fixed time intervals to minimize storage or transmission costs. Further, the actual implementations for performing such capture and/or retrieval will vary by application. These variations include but are not limited to traditional camera arrangements, including those connected to a suitable intelligent system, smart camera systems, augmented reality equipment such as head gear and/or goggles, and webcams.

An image is then selected from a selected time interval or window (at 104). A digit or symbol is then extracted from the image (at 106). Any suitable technique may be used to extract the digit or symbol. For example, Optical Character Recognition (OCR) techniques may be used. Alternatively, deep network learning or trained techniques may be used. In at least one form, techniques described in U.S. patent application Ser. No. 18/097,906, filed Jan. 17, 2023, and entitled, "A Method and System for Single Digit Inferences from Unsegmented Displays in Images," incorporated herein in its entirety by this reference, may be used.

Once the digits or symbol is determined, it is placed in an appropriate bin corresponding to the determined digit (at 108). In at least one form, one bin could be used for a multi-digit number or value consisting of multiple digits or symbols directly if there are a small number of values of interest. But, when the range of measurements is large, individual digits can be binned to get maximally stable estimates for each digit and then assembled into a number (e.g., the stabilized digits "5", "3", "2" become the number 532)—which is preferred in at least some implementations (but could, of course, vary by implementation). Here, the number might also be a structured entity such as a time that incorporates a colon or status indicator that incorporates other symbols. As the technique iterates, it will be appreciated that various bins will be populated with results. In at least one form, the bins are those of a histogram, although other types of bins or designation to collect similar results could be implemented. Next, a determination is made as to whether there are more images available for the selected time interval or window (at 110). If so, the next image is processed as above, i.e., items 104 through 110 are implemented. If no further images are available for processing from the selected time interval, a determination is made as to the inferred value of the digit for the fixed time interval of captured images based on maximum bin frequency for each digit or symbol (at 112). That is, the inference is determined based on the bin having the highest population of results. The value can be assembled from the digits. This value can then be output for use by downstream processes (at 113). Of course, the output may take a variety of forms based on the implementation. The form may depend on the ultimate implementation of the noted process. For example, the output may be used as feedback to control or adjust parameters for an overall process such as a manufacturing, inspecting or chemical process. In other applications, the output may be recorded, stored, or logged for any of a variety of uses based on the implementation. In still other forms, the output may be recorded, stored, or logged, before use, after use or in lieu of immediate use.

A determination is then made as to whether there are other images from other fixed time intervals or windows available for processing (at 114). If so, the procedure repeats starting at step 104. If not, the process stops (at 116).

As alluded to above, there are various sources of noise in systems. The noise addressed by the example method 100 of FIG. 1 is noise that results from visual or observational inference techniques and, as mentioned, is typically not Gaussian in nature. As such, this type of noise may be referred to as visual or observational noise. However, in many applications, the process being observed or measured may have underlying noise or errors in detections. For example, in the case of a scale, and readings thereof, tiny vibrations might cause the exact measured weight to vary continuously. As a further example, variations in temperature, e.g., ambient temperature, are a source of underlying process noise in environments such as plants, e.g., chemical plants, or other manufacturing facilities. These types of noise may be referred to as process noise. In many cases, process noise is approximately Gaussian and may be processed or smoothed by simple averaging techniques. Thus, where readings vary due to underlying variation in the observed process, various models, including hybrid models, may be used to address both the observational or visual noise and the underlying process noise.

Figure 2:
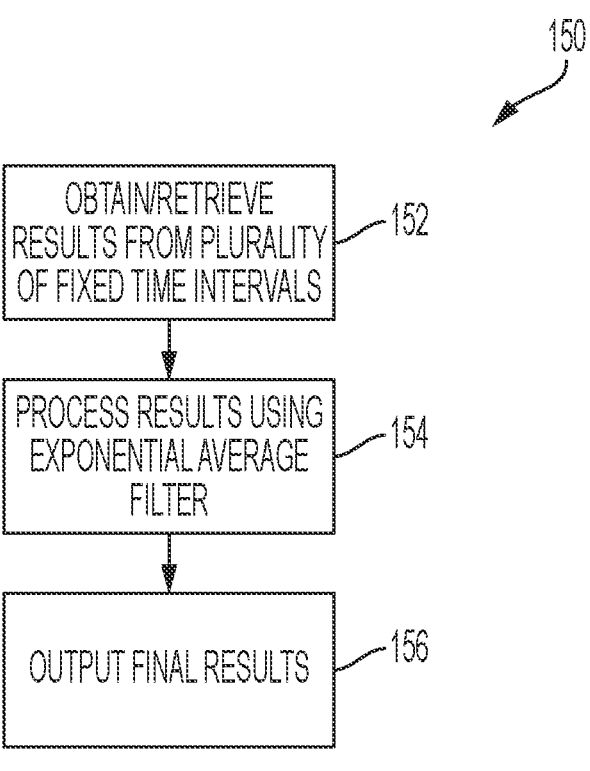
FIG. 2 is a flowchart of an example method according to the presently described embodiments.

In this regard, with reference to FIG. 2, a flowchart for an example method 150 is shown. As shown, the method 150 is, in at least one form, initiated upon the obtainment and/or retrieval of results of a plurality of fixed time intervals or windows (at 152). The results obtained or retrieved could be generated in a variety of manners. However, in at least one form, the results obtained or retrieved are generated according to the example method 100 of FIG. 1. That is, the value assembled from stabilized digits are inferred from a plurality of images captured over fixed time intervals or windows. The inferred value from each time interval or window are then fed into the method 150.

These results, e.g., inferred values over fixed time intervals or windows, are then processed using, for example, an exponential averaging filter (at 154). It is to be appreciated that any suitable averaging technique could be used (e.g., a specialized procedure for averaging times with minutes and seconds). The results from the exponential averaging filter are then output (at 156). The output could take a variety of forms. The form may depend on the ultimate implementation of the noted process. For example, the output may be used as feedback to control or adjust parameters for an overall process such as a manufacturing, inspecting or chemical process. In other applications, the output may be recorded, stored, or logged for any of a variety of uses based on the implementation. In still other forms, the output may be recorded, stored, or logged, before use, after use or in lieu of immediate use.

The above noted example of control could be implemented in a variety of ways including in a manual fashion whereby, for example, a technician uses the improved data that is output from the system to manually make adjustments to the process, either upstream or downstream. In another form, the control is automated. For example, the output may be fed into an automated controller or control system. One example of such an automated controller that may be suited for such input is a Proportional Integrative Derivative (PID) Controller. PID Controllers may be used in variety of environments such as the noted manufacturing environments. For example, a PID Controller may be used to control a heating element in a portion of a process.

Accordingly, by implementing a method that includes both example methods 100 and 150, both observational or visual noise and underlying process noise can be addressed to obtain improved, e.g., optimized, results for a system.

In another alternative, a hybrid technique that addresses both observational or visual noise and underlying process noise is implemented. In this technique, video frames are collected over a fixed time interval or window. Visual inference of digits are then run on each frame to get a number. A Gaussian mixture model with k different classes is used to cluster the numbers from the window into components. Each component of the Gaussian mixture will have a mean, variance and prior probability. After updating with the visual observation, the component with highest posterior probability is selected and its mean value is used. In this way, the visual inference noise is addressed by discarding non-maximal mixture components and the underlying process noise is addressed by using Gaussian averaging within the component. This method may be preferred when continuous values with many digits of precision are desired making the histogram approach impractical.

Figure 3:
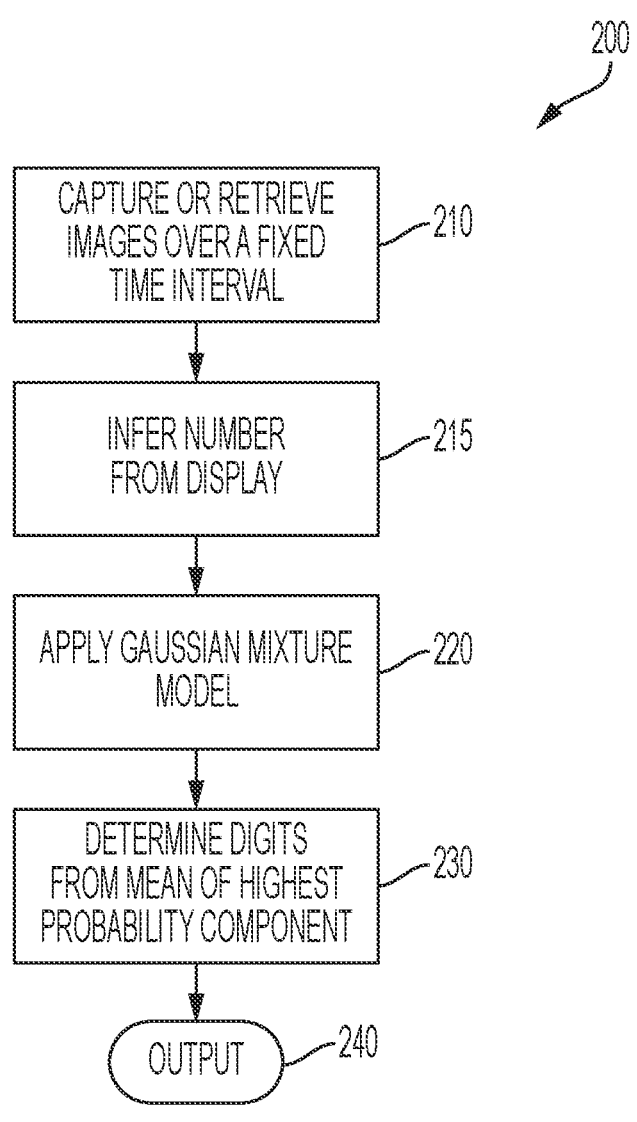
FIG. 3 is a flowchart of an example method according to the presently described embodiments.

In this regard, reference is now made to FIG. 3. FIG. 3 shows a flowchart for an example method 200. The method 200, in at least one form, is initiated with the capture or retrieval of images over a fixed time interval or window (at 210). As above, the time for such capture and the fixed time intervals or windows over which sets of images are captured varies from application to application. Any suitable technique will suffice. Likewise, the actual implementations for performing such capture and/or retrieval will vary by application, as referenced above. The images are run through an inference procedure (at 215) to extract numbers from the images. A Gaussian Mixture Model is then applied to these numbers (at 220), as noted which results in a number of discrete modes captured by Gaussian distributions. The optimal number of modes will be application dependent. In at least one form, the number of modes k can be set (by, for example, an implementer such as an application engineer) to some reasonable values such as 3 or 4 or if necessary, a more expensive non-parametric classification model based on a Chinese restaurant/Gaussian process code be used. Digits or numbers are determined in this environment based on highest posterior probability mode (at 230). The component with highest posterior probability is selected and its mean value is returned as the inference. The results are then output (at 240). This approach, in at least one form allows spurious readings due to visual artifacts to cluster in a distinct mode which can be eliminated if it is lower probability than the mode collecting the true value. Because each mode contains a Gaussian, it can handle data where there are many possible values associated with the correct mode but they are distinct from the incorrect mode.

As noted above, the output could take a variety of forms. The form may depend on the ultimate implementation of the noted process. For example, the output may be used as feedback to control or adjust parameters for an overall process such as a manufacturing, inspecting or chemical process. In other applications, the output may be recorded, stored, or logged for any of a variety of uses based on the implementation. In still other forms, the output may be recorded, stored, or logged, before use, after use or in lieu of immediate use.

Other embodiments of this concept could use a mixture model to capture visual noise modes but employ alternative distributions to Gaussian distributions in the mixture to handle non-Gaussian noise in the underlying measured process (e.g., Poisson).

Figure 4:
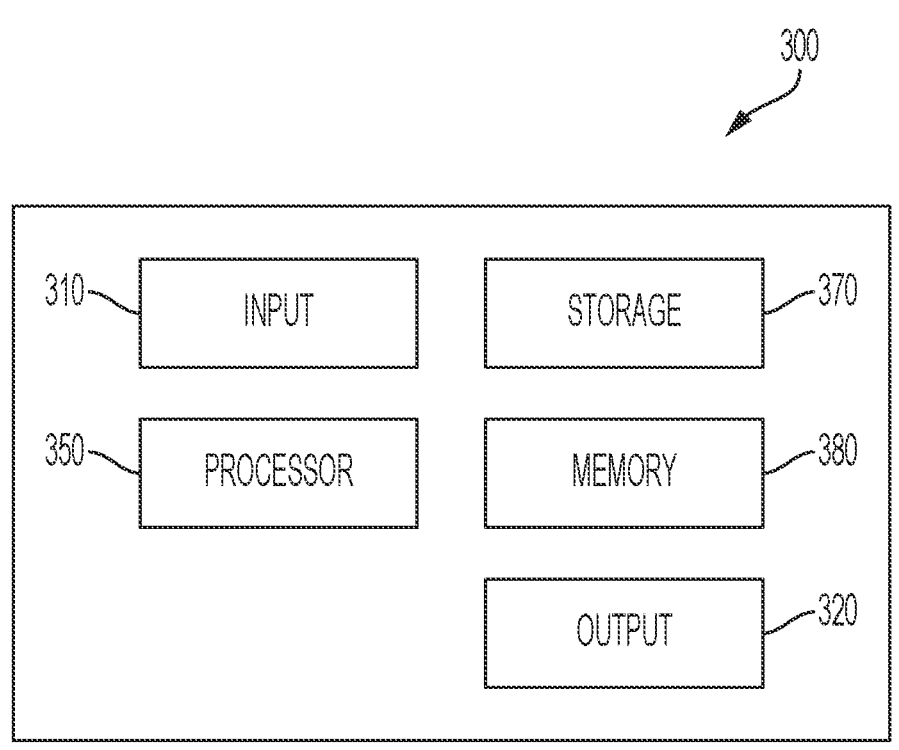
FIG. 4 is a block diagram of an example system in which the presently described embodiments may be implemented.

With reference now to FIG. 4, the above-described methods 100, 150, and 200, and other methods according to the presently described embodiments, as well as suitable architecture such as system components useful to implement the presently described embodiment and in connection with other embodiments described herein (such as those described, for example, in connection with FIGS. 1-3), can be implemented on a computer using well-known computer processors, memory units, storage devices, computer software, and other components. A high-level block diagram of such a computer is illustrated in FIG. 4. Computer 300 contains at least one processor 350, which controls the overall operation of the computer 300 by executing computer program instructions which define such operation. The computer program instructions may be stored in at least one storage device or memory 380 (e.g., a magnetic disk or any other suitable non-transitory computer readable medium or memory device) and loaded into another memory 380 (e.g., a magnetic disk or any other suitable non-transitory computer readable medium or memory device), or another segment of memory 370, when execution of the computer program instructions is desired. Thus, the steps of the methods described herein (such as methods of FIGS. 1-3) may be defined by the computer program instructions stored in the memory 380 and controlled by the processor 350 executing the computer program instructions. The computer 300 may include one or more input elements 310 and output elements 320 for communicating with other devices via a network. The computer 300 also includes a user interface that enables user interaction with the computer 300. The user interface may include I/O devices (e.g., keyboard, mouse, speakers, buttons, etc.) to allow the user to interact with the computer. Such input/output devices may also include a camera or other vision-based elements to capture images or to frame or capture an environment for a useful implementation in accordance with embodiments described herein. The user interface also includes a display for displaying images and spatial realism maps to the user.

According to various embodiments, FIG. 4 is a high-level representation of possible components of a computer for illustrative purposes and the computer may contain other components. Also, the computer 300 is illustrated as a single device or system. However, the computer 300 may be implemented as more than one device or system and, in some forms, may be a distributed system with components or functions suitably distributed in, for example, a network or in various locations.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system to improve the stability of inference for the state of a system parameter from a sequence of images of a measuring device with a digital display, the system comprising:

an image sensor configured to capture the sequence of images of the measuring device with the digital display;

at least one processor configured to process the sequence of images from the image sensor;

and at least one memory having stored thereon instructions that, when executed, cause the system to perform:

extracting digits from the images;

populating mathematical bins with the digits extracted from the images;

selecting at least one value that is most frequent based on population of the bins; and outputting the selected at least one value as representative of one or more digits included in the captured sequence of images.

2. The system as set forth in claim 1 wherein the bins are histogram bins.

3. The system as set forth in claim 1 wherein the system is further caused to perform outputting selected values within at least one of a camera, augmented reality equipment, and a webcam.

4. The system as set forth in claim 1 wherein the system is further caused to perform processing selected values using an exponential averaging filter to obtain results representing a display of digits on the digital display.

5. The system as set forth in claim 4 wherein the system is further caused to perform outputting the results in association with outputting the selected at least one value as representative of one or more digits included in the captured sequence of images.

6. A method which improves the stability of inference for the state of a system parameter from a sequence of images of a measuring device with a digital display, the method comprising:

capturing the sequence of images of the measuring device with the digital display using an image sensor;

extracting digits from the images using at least one processor configured to process the sequence of images from the image sensor;

populating mathematical bins with the digits extracted from the images using the at least one processor;

selecting at least one value that is most frequent based on population of the bins using the at least one processor; and outputting the selected at least one value as representative of one or more digits included in the captured sequence of images such that the stability of inference for the state of the system parameter is improved.

7. The method as set forth in claim 6 wherein the bins are histogram bins.

8. The method as set forth in claim 6 further comprising outputting selected values.

9. The method as set forth in claim 6 wherein selected values are processed using an exponential averaging filter to obtain results representing a display of digits on the digital display.

10. The method as set forth in claim 9 further comprising outputting the results in association with outputting the selected at least one value as representative of one or more digits included in the captured sequence of images.

11. A non-transitory computer readable medium having instructions stored thereon that, when executed by a processer, cause an apparatus to perform a method which improves the stability of inference for the state of a system parameter from a sequence of images of a measuring device with a digital display, the method comprising:

receiving, from an image sensor, the sequence of the measuring device with the digital display;

extracting digits from the images;

populating mathematical bins with the digits extracted from the images;

selecting at least one value that is most frequent based on population of the bins; and outputting the selected at least one value as representative of one or more digits included in the sequence of images such that the stability of inference for the state of the system parameter is improved.

12. The non-transitory computer readable medium as set forth in claim 11 wherein the apparatus is further caused to perform outputting selected values.

13. The non-transitory computer readable medium as set forth in claim 11 wherein the apparatus is further caused to perform processing on selected values using an exponential averaging filter to obtain results representing a display of digits on the digital display.

14. The non-transitory computer readable medium as set forth in claim 13 wherein the apparatus is further caused to perform outputting the results in association with outputting the selected at least one value as representative of one or more digits included in the captured sequence of images.

\* \* \* \* \*